United States Patent [19]

Takei et al.

[11] Patent Number: 4,531,170
[45] Date of Patent: Jul. 23, 1985

[54] COMBINATION MAGNETIC HEAD

[75] Inventors: Shushi Takei, Yokohama; Akio Onuki, Ichikawa, both of Japan

[73] Assignee: Tokyo Shibaura Denki Kabushiki Kaisha, Kawasaki, Japan

[21] Appl. No.: 377,843

[22] Filed: May 13, 1982

[30] Foreign Application Priority Data

May 18, 1981 [JP] Japan ................................. 56-73480

[51] Int. Cl.³ .............................................. G11B 5/12
[52] U.S. Cl. .................................. 360/119; 360/121; 360/122; 360/125
[58] Field of Search ............... 360/122, 121, 125, 119, 360/118

[56] References Cited

U.S. PATENT DOCUMENTS

| 3,562,442 | 2/1971 | Pear | 360/122 |
|---|---|---|---|
| 4,017,899 | 4/1977 | Bagby | 360/122 |
| 4,240,121 | 12/1980 | Prochnow | 360/122 |
| 4,285,019 | 8/1981 | Scott et al. | 360/122 |

FOREIGN PATENT DOCUMENTS

| 0035943 | 3/1981 | European Pat. Off. | |
|---|---|---|---|
| 1222114 | 8/1966 | Fed. Rep. of Germany | 360/122 |
| 267215 | 12/1968 | Fed. Rep. of Germany | |
| 2057927 | 5/1972 | Fed. Rep. of Germany | 360/122 |
| 576683 | 12/1973 | Fed. Rep. of Germany | |
| 56-29829 | 3/1981 | Japan | 360/121 |
| 1142993 | 10/1966 | United Kingdom | |
| 1245064 | 10/1969 | United Kingdom | |
| 1356005 | 8/1971 | United Kingdom | |
| 1436396 | 12/1973 | United Kingdom | |

Primary Examiner—Robert L. Richardson
Attorney, Agent, or Firm—Oblon, Fisher, Spivak, McClelland & Maier

[57] ABSTRACT

A combination magnetic head is formed with first and second gaps on a head face to be slidably contacted with a tape. The head face has first, second and third surface sections, the first and second surface sections are respectively formed on the first and second cores, and the third section is formed on a spacer for integrally coupling the first and second cores. The first and third surface sections decreases in the width toward the second surface section, the second surface section varies in the width, and the second surface section becomes at the minimum in the width in the vicinity of the gap of the second surface section.

6 Claims, 11 Drawing Figures

COMBINATION MAGNETIC HEAD

BACKGROUND OF THE INVENTION

This invention relates to a combination magnetic head and, more particularly, to a two gap magnetic head.

Audio and video cassette-type tape recorders are recently reduced in weight and dimensions, and magnetic heads to be associated within the tape recorders are accordingly desired to be further reduced in size. For that purpose, a two gap magnetic head in which an erase magnetic head as well and record and reproduction magnetic heads are integrated have been developed and have also been further modified.

The conventional two gap magnetic head has a head face on which a tape is slidably contacted and the tape is driven. This head face has first, second and third sections, the first and second sections are respectively formed on first and second magnetic cores, and the third section is formed on a spacer made of a non-magnetic material, e.g., glass for integrally coupling the first and second magnetic cores. First and second nonmagnetic gaps are respectively formed on the first and second head face sections, and windings are respectively provided on the first and second magnetic cores.

In the conventional two gap magnetic head, the head face is curved along the running direction of the tape so as to improve the intimate contact of the tape to the head face. The more the head face is worn, the more frequently the tape runs on the head face, but the degree of the wear of the head face is not uniform over the entire surface of the head face, and the entrance side of the tape, e.g., the first head face section is worn much more than the exhaust side of the tape, e.g., the second head face section. Accordingly, there feasibly occurs a difficulty such that the head face iself at the exhaust side of the tape is worn to the extent allowable for the deterioration of the performance but the performance of the head face at the entrance side of the tape is worn to the degree not permitted for the allowable value, and hence the magnetic head itself becomes impossible in use, thereby shortening the lifetime of the magnetic head.

SUMMARY OF THE INVENTION

It is an object of the present invention to provide a magnetic head of long lifetime having a head face which can be relatively uniformly worn by a tape.

According to the present invention, there is provided a magnetic head which comprises first and second cores and a spacer coupled integrally between the cores. This magnetic head has a head face on which a tape is slidably contacted, and the head face having first and second surface sections on first and second cores and third surface section on a spacer. The first, second and third sections are arranged continuously. Windings are respectively formed on the first and second cores and gaps are respectively formed at the first and second surface sections. The area of the first surface sections is larger than that of the third surface section.

DETAILED DESCRIPTION OF THE PREFERRED EMBODIMENTS

The present invention will now be described in more detail with reference to the accompanying drawings.

Figure 1:
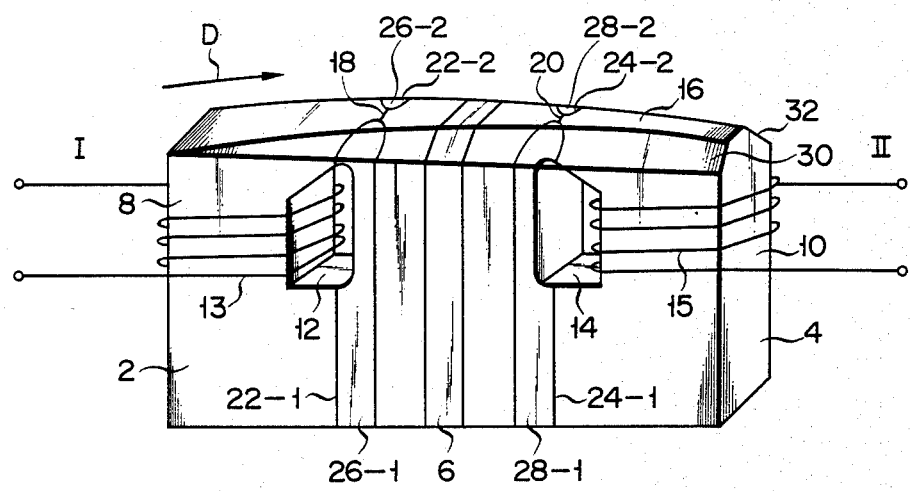
FIG. 1 is a perspective view showing a combination magnetic head according to one preferred embodiment of the present invention.
Figure 2:
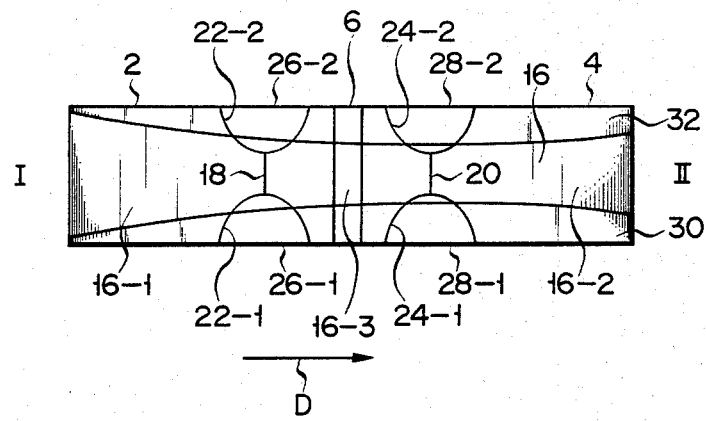
FIG. 2 is a plan view of the combination magnetic head shown in FIG. 1.

FIG. 1 shows one preferred embodiment of the magnetic head according to the present invention. This magnetic head comprises first and second cores 2, 4 and a spacer 6 made of a non-magnetic material, e.g., glass, organic adhesive, etc., and the first and second cores 2, 4 are integrally coupled with the spacer 6. Through holes 12, 14 are perforated at the cores 2, 4, respectively to define core legs 8, 10, respectively, and windings 13, 15 are respectively wound on the core legs 8, 10. A head face 16 on which a tape (not shown) is slidably contacted and the tape runs, is formed on the front surface of the magnetic head as shown in FIGS. 1 and 2. The head face 16 has first and second sections 16-1, 16-2 on the first and second cores 2, 4, and a third section 16-3 on the spacer 6, and an erasing gap 18 as well as recording and reproduction gap 20 are respectively perforated to the through holes 12, 14 at the first and second head face sections 16-1, 16-2. Recesses 22-1, 22-2 formed at both sides of the first core block 2 are formed from the front surface to the back surface of the magnetic head to communicate with the erasing gap 18 at both ends of the erasing gap 18. Similarly, recesses 24-1, 24-2 formed at both sides of the second core 4 are formed from the front surface to the back surface of the magnetic head to communicate with the gap 20 at both ends of the recording and reproduction gap 20. Non-magnetic material, e.g., glass 26-1, 26-2, 28-1, 28-2 are respectively filled in the recesses 22-1, 22-2, 24-1, 24-2. The widths of the gap 18, 20 correspond to the width of the tracks on the tape, and the widths TW1, TW2 are defined by a pair of recesses 22-1, 22-2 and 24-1, 24-2.

As evident from FIG. 1, the head face 16 is curved along the running direction of the tape at a predetermined radius R of curvature, thereby enhancing the intimate contact of the tape to the head face 16. Similarly, the front surface of the magnetic head is cut at both side ends for the purpose of increasing the intimate contact of the tape to the head face 16, and the head face 16 defined between the cut parts 30 and 32 is so formed as to be narrower than the width of the cores 2, 4, that is, the width W of the magnetic head. As evident further from FIGS. 2 through 5, the head face 16 does not have uniform width from the entrance side I of the tape to the exhaust side II, is gradually decreased in the width along the running direction of the tape as shown by an arrow D, is decreased at the minimum in the width in the vicinity of the recording and reproduction gap 20, and is increased in the width slightly at the exhaust side II. That is, the first and second head face sections 16-1, 16-2 have a same longitudinal length each other, the area $S_I$ of the first head face section 16-1 at the tape entrance side I is larger than the area $S_{II}$ of the second head face section 16-2 at the tape exhaust side II, and the ratio $S_I/S_{II}$ is larger than 1 and smaller than 2.0, preferably set at 1.3 to 1.7. The reason is such that the present inventors have discovered the fact that the frictional force given from the tape to the first head face section 16-1 at the tape entrance side I is larger than that given from the tape to the second head face section 16-2 at the tape exhaust side II. Accordingly, when the areas of the first and second head face sections 16-1, 16-2 are merely equal, the first head face section 16-1 is worn faster than the second head face section 16-2. When a tape is run on the head face of the conventional magnetic head approximately for 100 to 200 hours, there occurs the difference of the gap depth of approx. 10 to 15 μm between the two gaps of the initial gaps of 30 to 40 μm equally provided to one another, and hence the magnetic head might become impossible to use. Since the area of the first head face section 16-1 at the tape entrance side I in the magnetic head shown in FIGS. 1 and 2 is, on the other hand, larger than the area of the second head face section 16-2 at the tape exhaust side II, the frictional force per unit area of the first head face section 16-1 can be, even if the frictional force larger than that given from the tape to the second head face section 16-2 is applied from the tape to the first head face section 16-1, retained within the equal degree to that of the second head face section 16-2, with the result that the worn degrees of the first and second head face sections 16-1, 16-2 can be maintained substantially in equal degree.

Figure 3:
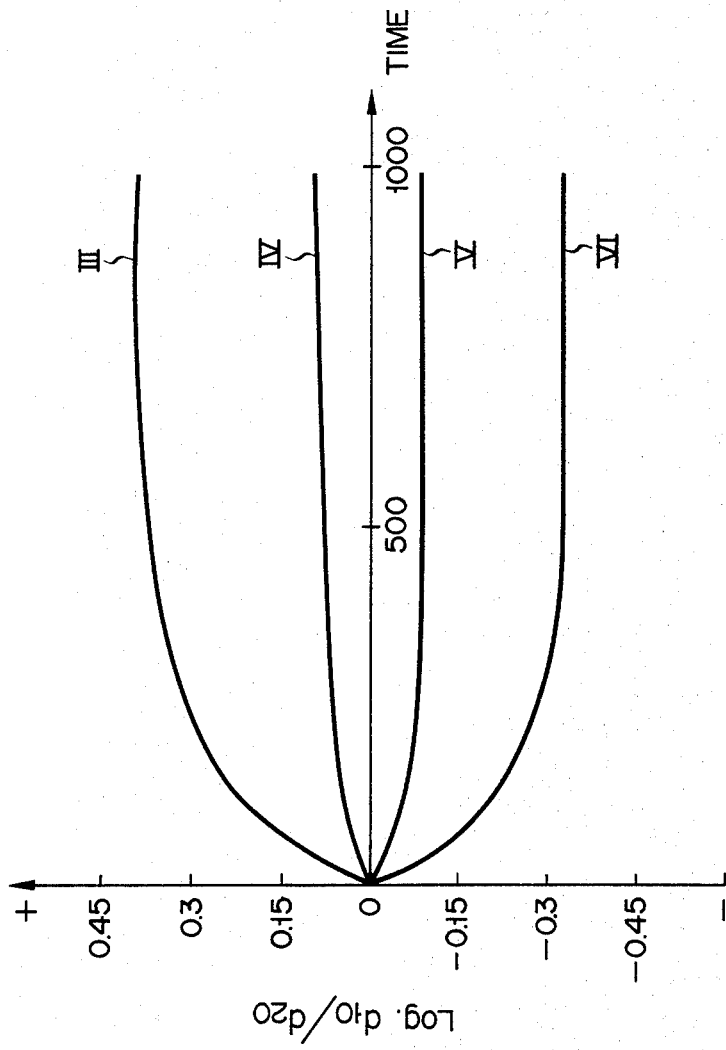
FIG. 3 is a graph showing the relationship between the irregular wear and the time.

FIG. 3 is a graph showing the relationship between the irregular wear degree Log $d_{10}/d_{20}$ and the time with the area ratio $S_I/S_{II}$ as a parameter, where $d_{10}$ represents the depth of the erasing gap 18, $d_{20}$ represents the depth of the recording and reproduction gap 20, a curve III is in case of the area ratio $S_I/S_{II}=2.0$, a curve IV represents in case of the area ratio $S_I/S_{II}=1.7$, a curve V is in case of $S_I/S_{II}=1.3$, and a curve VI is in case of $S_I/S_{II}=1.0$, respectively. The irregular wear degree Log $d_{10}/d_{20}$ of the ordinate axis is zero initially i.e., when the tape is not run on the head face 16 at all. That is, in the magnetic head, two gap depths are initially set substantially equally. When the first head face section 16-1 is worn more than the second head face section 16-2 in case that the tape is run on the head face 16 to thus cause the head face 16 to be worn, the depth of the gap 18 becomes smaller than the depth of the gap 20, resulting in $d_{10}/d_{20}<1$ and Log $d_{10}/d_{20}<0$. When the first head face section 16-1 is, on the other hand, less worn than the second head face section 16-2, the depth of the gap 18 becomes larger than that of the gap 20, resulting in $d_{10}/d_{20}>1$ and Log $d_{10}/d_{20}>0$. When the area ratio becomes larger than the ratio $S_I/S_{II}=2.0$ of the curve III, i.e., when the first head face section 16-1 has the area higher than the twice of the area of the second head face section 16-2, it is empirically confirmed that the tape is not preferably slidably contacted with the head face 16. Then, the depth $d_{10}$ of the erasing gap 18 is, as shown by the curve VI in FIG. 3, decreased as compared with the depth $d_{20}$ of the gap 20. Accordingly, it is required that the area ratio $S_I/S_{II}$ of the two sections 16-1 and 16-2 should be higher than 1.0 and lower than 2.0. Further it is understood from the curves IV and V in FIG. 3 that, when the area ratio $S_I/S_{II}$ is in the range from 1.3 to 1.7, the difference of the gap depths is smaller as compared with the tape running period of time, and the two gaps are substantially uniformly worn. Accordingly, since the substantially uniform wear degree can be provided in the range of the area ratio $S_I/S_{II}$ from 1.3 to 1.7, it was confirmed that the magnetic head was retained within the allowable value for the deterioration of the performance, even if the tape is run on the head face for approx. 1,000 hours.

Figure 4:
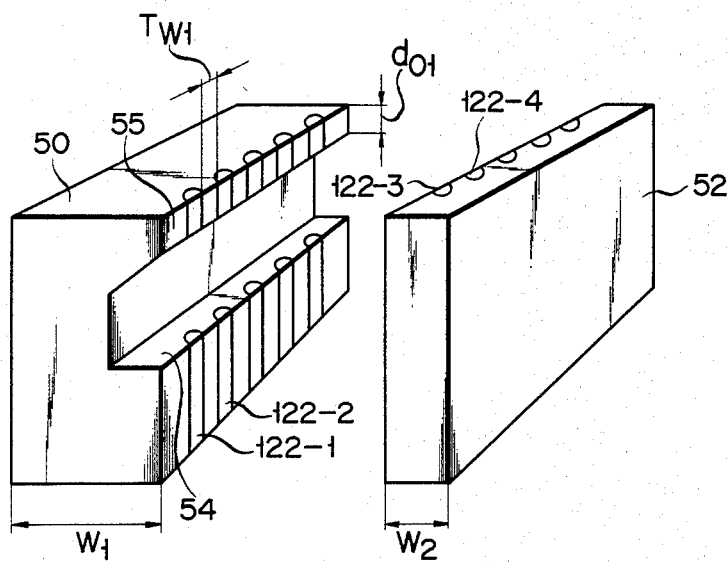
FIG. 4 is a perspective view showing core pieces for the expolanatory purpose of the steps of fabricating a core block.
Figure 5A:
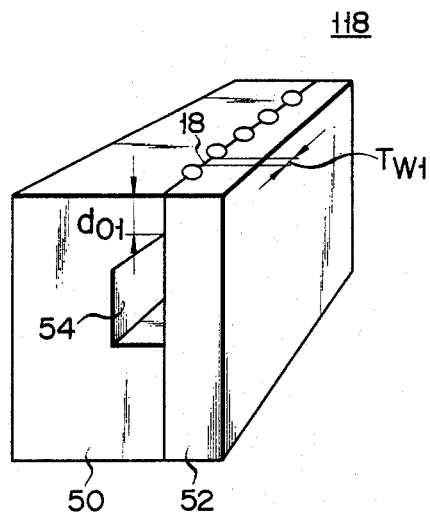
FIGS. 5A and 5B are perspective views showing the core block fabricated from core pieces shown in FIG. 4.
Figure 5B:
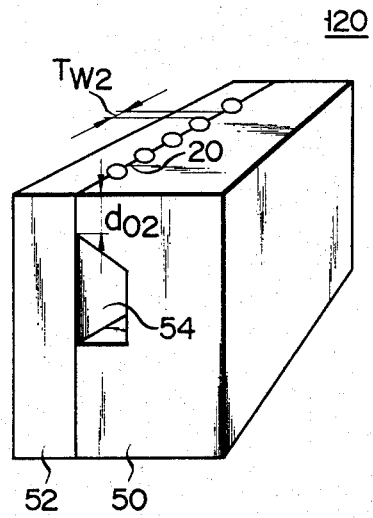

The steps of fabricating the magnetic head shown in FIGS. 1 and 2 will now be described with reference to FIGS. 4 through 10. Core blocks 118 and 120 are initially fabricated as the base material for fabricating the cores 18, 20 shown in FIG. 1, as shown in FIGS. 5A and 5B. More particularly, a pair of core pieces 50, 52 fabricated by the magnetic material as shown in FIG. 4 are prepared. The core piece 50 is formed in a rectangular shape with the width $W_1$, and has a longitudinal recess 54 for defining the through hole 12 of the core 2, a projection 55 having the depth $d_{01}$ for defining the gaps on the upper part, and a number of recesses 122-1, 122-2 formed with the track width $T_{W1}$ left therebetween, the width $T_{W1}$ defining the track width from the front surface to the back surface. The core piece 52 is formed in a flat plate shape having width $W_2$ which is equal to or thinner than the with $W_1$ of the core piece 50, and a number of recesses 122-3, 122-4 are formed in the core piece from the front surface to the back surface with the track width $T_{W1}$ left therebetween, the track width $T_{W1}$ corresponding to the recesses 122-1, 122-2 for defining the track width. To the recesses 122-1, 122-2, 122-3, 122-4 of the core pieces 50, 52 is flowed heated non-magnetic material, e.g., glass or the like. After the non-magnetic material is solidified, the side surfaces of the core pieces 50, 52 and the solidified non-magnetic material are ground or polished, a pair of core pieces 50, 52 are so adhered with organic adhesive or glass as to be formed with gaps via the predetermined length thereon, and the first core block 118 is thus formed as shown in FIG. 5A. Similarly, the second core block 120 shown in FIG. 5B is formed. A projection 54 having the depth $d_{02}$ for defining the gap thereon is similarly formed on the core piece 50 of the second core block 120, and the gap width is formed in width $T_{W2}$ with the gap depth $d_{02}$.

In the embodiment described above, the joining step of the two core pieces 50, 52 and the filling step of the non-magnetic material to the recesses of the core pieces 50, 52 are separately carried out when fabricating the above-described core blocks 118 and 120, but may also be simultaneously carried out.

Figure 6:
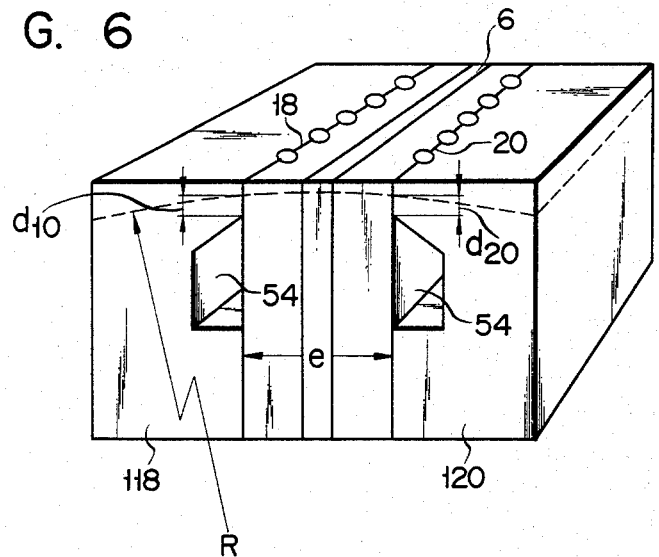
FIG. 6 is a perspective view showing the head block fabricated from the core blocks shown in FIGS. 5A and 5B.
Figure 7:
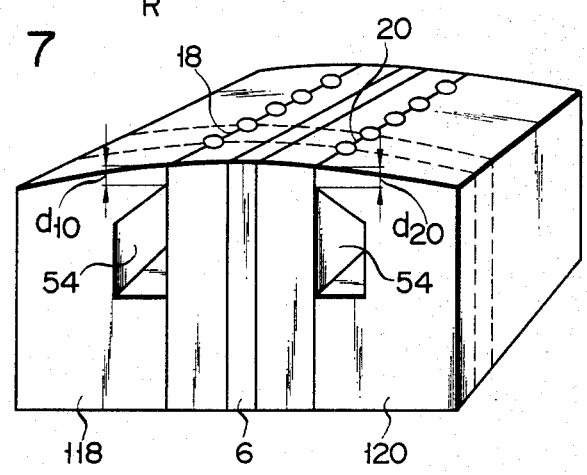
FIG. 7 is a perspective view showing the head block fabricated by grinding the head block shown in FIG. 6.
Figure 8:
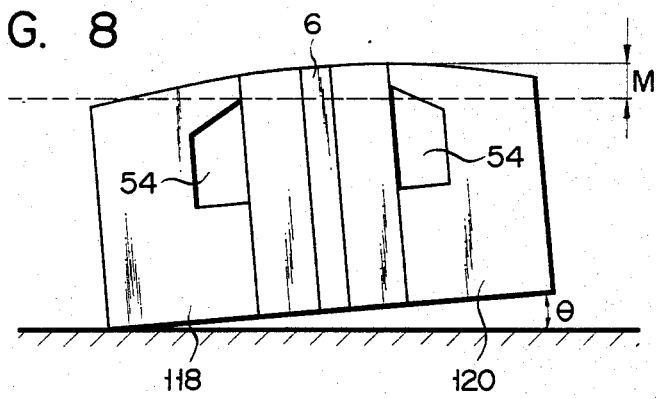
FIG. 8 is a side view showing the step of cutting a notch at the head block shown in FIG. 7.

The core blocks 118, 120 thus fabricated in the above steps, are joined with organic adhesive or glass or the like through the non-magnetic spacer 6 formed of ceramic or the like for maintaining the interval between the two gaps 18, 20 to a predetermined value l as shown in FIG. 6, and the head block is formed. This head block has, as shown in FIG. 7, the radius R of curvature on the front surface, and is polished until the gaps 18, 20 respectively have the gap depths $d_{10}$, $d_{20}$. The gap depths $d_{10}$, $d_{20}$ are ordinarily formed equally to one another. Then, the head block is inclined, as shown in FIG. 8, at an angle θ so that the region on the head face 16 in the vicinity of the gap 20 becomes the top. The head block thus inclined is cut with notches along one-dotted chain lines in FIGS. 7 and 9 passing through the centers of a pair of recesses 22-1, 24-1 and 22-2, 24-2 facing through the spacer 6 with each other. This notch is formed by a rotary grindstone 58 having wedge section shown in FIG. 10, and the head block is so formed with notched grooves 60, 62 having the maximum depth M in the region on the head face 16 in the vicinity of the top and hence the gap 20 with this notch as shown by broken lines in FIG. 9. In this step of cutting the notch, the head face 16 is so formed as to gradually decrease the width from the tape entrance side, to be at the minimum in the width in the vicinity of the gap 20 and to be slightly expanded toward the tape exhaust side. It is noted as below to cut the notch. Since the strength of the head might become extremely low due to excessively thin thickness at the front part of the head when the notch is excessively deeply formed, the depth of the notch should be selected to the optimum value for providing sufficient strength for the head. When the head face shown in FIG. 2 is formed, excessively shallow notch is insufficient. It is required to form the notch having the depth capable of giving the area ratio $S_I/S_{II}$ described with reference to FIG. 3. It is further required not to vary the width of the gap by forming the notch.

Figure 9:
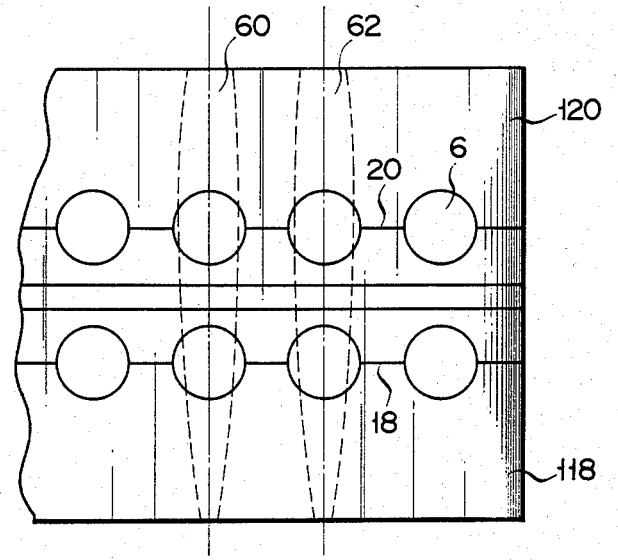
FIG. 9 is a plan view showing a part of the head block shown in FIG. 7 and illustrating the region to be cut with the notch with broken lines.
Figure 10:
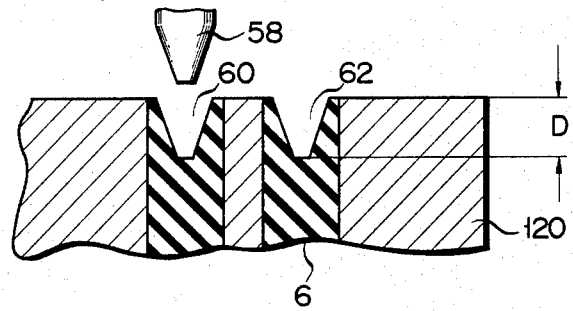
FIG. 10 is a sectional view showing a part of the head block cut with the notch in cross section.

The head block thus cut with the notch is then cut along the one-dotted chain line passing through the center of the recess shown in FIGS. 7 and 9, and a plurality of magnetic heads can be thus completed.

As obvious from the foregoing description, according to the present invention, there is provided a combination magnetic head which can provide uniformly wearing characteristic for the head face by enhancing the intimate contact of the gap to the magnetic tape. Accordingly, the lifetime of the head can be prolonged.

What we claim is:

1. A magnetic head comprising:
   a first core formed of magnetic material and having first surface section to be slidably contacted with a tape and first gap formed on the first surface section,
   a first winding provided on said first core,
   a second core formed of magnetic material and having second surface section to be slidably contacted with a tape and second gap formed on the second surface section,
   a second winding provided on said second core, said first and second cores defining a longitudinal direction, and
   a spacer interposed between said first and second cores to integrally coupled said first and second cores, said spacer having a third surface section to be slidably contacted with a tape and formed of non-magnetic material, the third surface section continuously arranged between the first and second surface sections to define a head face to be run with a tape, said head face including cut-away edge portions in a circular-arc-shape along the running direction of the tape, with said cut-away edge portions being dimensioned such that said first surface section has an area larger than that of said second surface section.

2. A magnetic head according to claim 1, wherein said first and second surface sections each have a same length in the longitudinal direction.

3. A magnetic head according to claim 1, wherein each of said first and third surface sections has a width decreasing toward the second surface section and said second surface section has a width being changed along said longitudinal direction and being minimum at the vicinity of the second gap.

4. A magnetic head according to claim 1, wherein said first surface section has the area smaller than the twice of the area of the second surface section.

5. A magnetic head according to claim 1, wherein said first surface section has the area $S_I$ defined by the following formula, $$1.3 \leq S_I/S_{II} \leq 1.7$$

where $S_{II}$ represents the area of the second surface section.

6. A magnetic head according to claim 1, wherein said first core has a pair of recesses buried with non-magnetic material, said first gap is defined between a pair of the recesses, said second core has a pair of recesses buried with the non-magnetic material, and said second gap is defined between a pair of the recesses.

* * * * *